US009901208B2

(12) United States Patent
Mori et al.

(10) Patent No.: US 9,901,208 B2
(45) Date of Patent: Feb. 27, 2018

(54) BEVERAGE PREPARATION MACHINE WITH DROP MANAGEMENT

(71) Applicant: NESTEC S.A., Vevey (CH)

(72) Inventors: Peter Mori, Walperswil (CH);
Alexandre Kollep, Lutry (CH);
Francois Besson, Colombier (CH)

(73) Assignee: Nestec S.A., Vevey (CH)

( * ) Notice: Subject to any disclaimer, the term of this patent is extended or adjusted under 35 U.S.C. 154(b) by 597 days.

(21) Appl. No.: 14/381,831

(22) PCT Filed: Feb. 28, 2013

(86) PCT No.: PCT/EP2013/054007
§ 371 (c)(1),
(2) Date: Aug. 28, 2014

(87) PCT Pub. No.: WO2013/127907
PCT Pub. Date: Sep. 6, 2013

(65) Prior Publication Data
US 2015/0040771 A1    Feb. 12, 2015

(30) Foreign Application Priority Data
Feb. 28, 2012 (EP) .................................. 12157248

(51) Int. Cl.
*A47J 31/46*   (2006.01)
*A47J 31/40*   (2006.01)
*A47J 31/36*   (2006.01)

(52) U.S. Cl.
CPC ........... *A47J 31/46* (2013.01); *A47J 31/3633* (2013.01); *A47J 31/407* (2013.01)

(58) Field of Classification Search
CPC ...... A47J 31/3633; A47J 31/407; A47J 31/46; A47J 31/3604; A47J 31/3623; A47J 31/3628; A47J 31/3638; A47J 31/3666
(Continued)

(56) References Cited

U.S. PATENT DOCUMENTS

| 5,521,347 A * | 5/1996 | Imaeda .................. H01H 13/60 200/525 |
| 2007/0209521 A1* | 9/2007 | Boussemart .......... A47J 31/061 99/275 |

(Continued)

FOREIGN PATENT DOCUMENTS

| EP | 1656863 | 5/2006 |
| EP | 2353474 | 8/2011 |

(Continued)

OTHER PUBLICATIONS

International Search Report for International Application No. PCT/EP2013/054007 dated Apr. 12, 2013.

(Continued)

*Primary Examiner* — Dana Ross
*Assistant Examiner* — Kuangyue Chen
(74) *Attorney, Agent, or Firm* — K&L Gates LLP

(57) ABSTRACT

A machine (1) for preparing a beverage (4') comprises a frame (2) and a beverage preparation module (9) supported by the frame, the module (9) having a part (10) that is movable relative to the frame between: a transfer position for introducing a beverage ingredient into the module (9) and/or removing the ingredient therefrom; and a processing position for forming the beverage from the ingredient in the module. The beverage preparation module further has a beverage outlet (11) for dispensing the formed beverage (4') to a beverage dispensing area (4) for receiving a user-recipient for collecting the beverage (4'). The frame (2) further supports a guide (20) configured to drain and deliver liquid residues (3') from the beverage outlet (11) to a service area (3) separate from the dispensing area (4) so that the residues (3') are inhibited from being drained from the beverage outlet (11) to the beverage dispensing area (4).

17 Claims, 4 Drawing Sheets

(58) Field of Classification Search
USPC .............................................. 99/295, 289 R
See application file for complete search history.

(56) References Cited

U.S. PATENT DOCUMENTS

2010/0288132 A1* 11/2010 Gavillet .............. A47J 31/3628
                                                            99/295
2011/0154993 A1*  6/2011 Bertolina ............ A47J 31/4407
                                                            99/280

FOREIGN PATENT DOCUMENTS

| JP | 5364090 | 5/1978 |
| WO | WO2004058019 | 7/2004 |
| WO | WO2009130099 | 10/2009 |
| WO | WO2009138863 | 11/2009 |
| WO | WO2011067264 | 6/2011 |

OTHER PUBLICATIONS

International Written Opinion for International Application No. PCT/EP2013/054007 dated Apr. 12, 2013.

\* cited by examiner

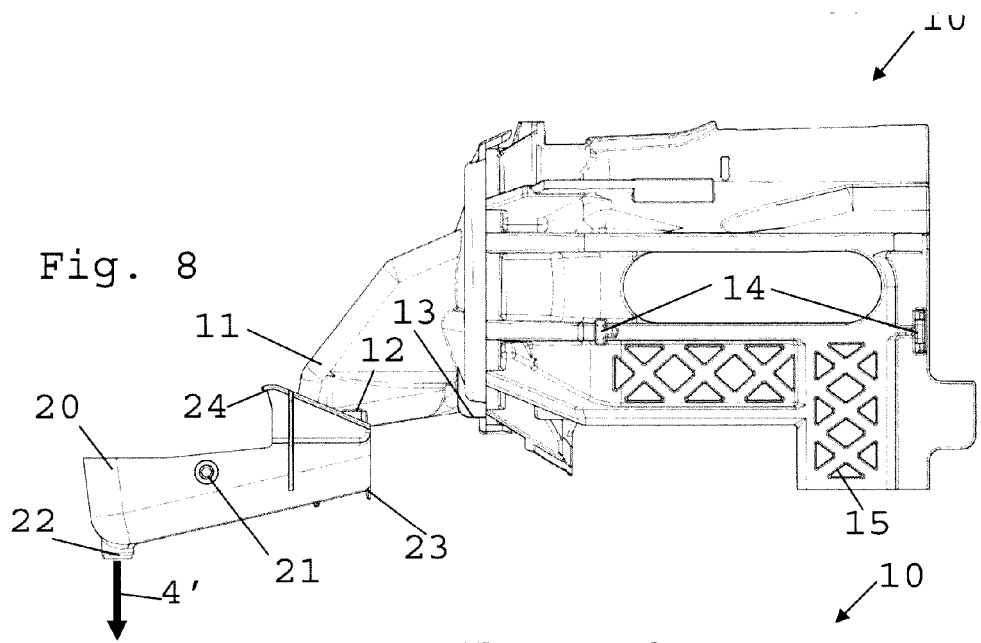
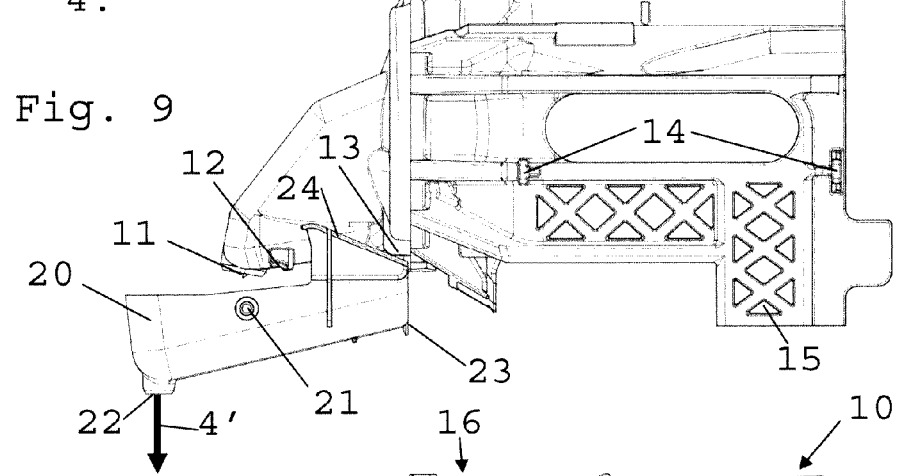
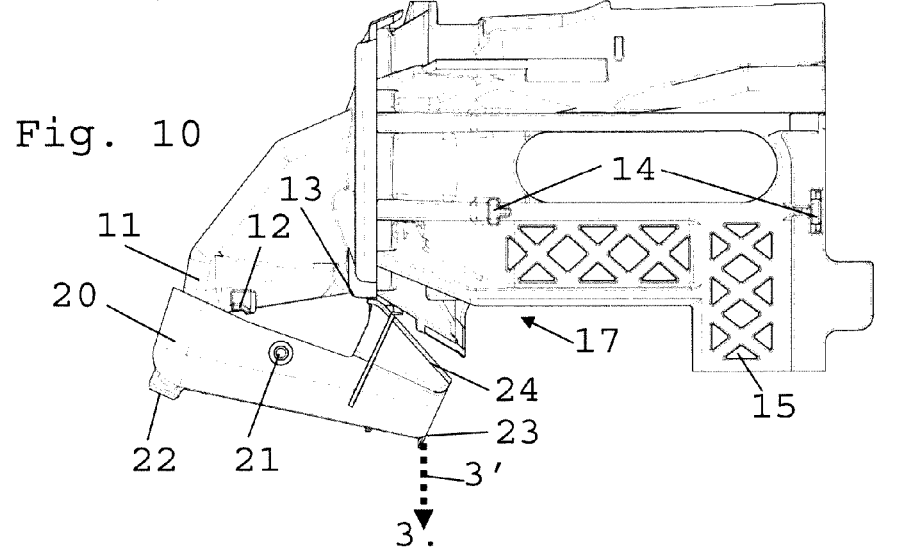

BEVERAGE PREPARATION MACHINE WITH DROP MANAGEMENT

CROSS REFERENCE TO RELATED APPLICATIONS

The present application is a National Stage of International Application No. PCT/EP2013/054007, filed on Feb. 28, 2013, which claims priority to European Patent Application No. 12157248.1, filed Feb. 28, 2012, the entire contents of which are being incorporated herein by reference.

FIELD OF THE INVENTION

The field of the invention pertains to beverage preparation machines, in particular using capsules of an ingredient of the beverage to be prepared, having an outlet for dispensing the beverage to a user-recipient in a dispensing area and an arrangement for preventing undesired dripping of beverage residues from such an outlet into the dispensing area, in particular after a beverage dispensing process and/or between beverage dispensing processes.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a boiler, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water. Drip tray devices with cup supports are well known in the art. There are also such devices that are further arranged for allowing the adjustment of the vertical position under the beverage outlet of cups of different sizes. Examples of arrangements in this field are disclosed in CA 2,260,352, EP 0 549 887, EP 1 731 065, EP 1 867 260, FR 2 439 042, U.S. Pat. No. 5,161,455, U.S. Pat. No. 5,353,692, WO 2009/074557.

WO 2006/050769 discloses a beverage preparation machine with a vertically movable cup support located under the machine's beverage outlet and a drop collector arm that is pivotable under the beverage outlet for collecting drops upon beverage dispensing. Another system for collecting drops at the end of beverage dispensing is disclosed in co-pending application PCT/EP11/071,547.

SUMMARY OF THE INVENTION

The invention relates to a machine for dispensing a beverage. The beverage preparation machine can be an in-home or out of home machine. The machine may be for the preparation of coffee, tea, chocolate, cacao, milk, soup, baby food, etc. . . . . The machine may be arranged for preparing within a beverage preparation module a beverage by passing hot or cold water or another liquid through a capsule containing an ingredient, such as a flavouring ingredient, of the beverage to be prepared, such as ground coffee or tea or chocolate or cacao or milk powder.

The machine of the invention includes: a frame and a beverage preparation module supported by the frame. For instance, the machine has a housing assembled to and/or formed by the frame. The module has a part that is movable relative to the frame between: a transfer position for introducing a beverage ingredient into the module and/or removing such ingredient therefrom, such ingredient being in particular supplied into the module within a capsule; and a processing position for forming such beverage from such ingredient in the module. The module further has a beverage outlet for dispensing the formed beverage to a beverage dispensing area for receiving a user-recipient, such as a cup or a mug, for collecting the beverage.

Typically, the beverage preparation module comprises a further part cooperating with the movable part for forming therewith an ingredient chamber in the processing position, optionally this further part is stationary relative to the frame, in particular the further part directly or indirectly fixed to the frame or integral therewith. Examples of such ingredient beverage preparation modules are disclosed in WO 2007/135135 and WO 2009/043630 and in the references cited therein. The movable part may be have a downstream beverage collection and draining arrangement and the cooperating part may have a upstream liquid inlet arrangement, and/or vice versa. The movable part and/or the further part of the module may comprise a hydraulic sealing piston for sealing the further part against the movable part, for instance as disclosed in WO 2011/042400.

The ingredient chamber can be configured to house a capsule containing the beverage ingredient. The ingredient chamber may comprise or may be associated with at least one capsule opener, such as at least one of: one or more puncturing and/or tearing elements; and one or more pins and/or blades, such as a capsule piercer or tearing plate, e.g. as known from EP 0 512 468, EP 0 512 470, EP 1 299 022 and EP 1 339 305.

The movable part of the beverage preparation module may delimit one or more passages for beverage to flow from the ingredient chamber to the outlet.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . In particular, a coffee machine may be configured for dispensing espressos, e.g. an adjustable volume of 20 to 60 ml per serving, and/or for dispensing lungos, e.g. a volume in the range of 70 to 150 ml per serving.

The beverage machine may in particular have a means for driving liquid, e.g. a pump, from a liquid source, e.g. a water tank, to the beverage preparation module. When the desired volume of liquid for a beverage preparation has been driven to the module, the driving of liquid is stopped. After the desired volume of liquid for the requested beverage has been driven from the source to the module has been reached, the beverage preparation and dispensing is deemed to be over. Additional liquid flowing from the module via the outlet is deemed to form beverage residues. The end of beverage dispensing may be nearly simultaneous with the stopping of the driving of liquid to the beverage module. However, depending upon the configuration and pressure management in the module, beverage dispensing may extend for a couple of seconds, e.g. 0.5 to 5, in particular 1 to 2.5 seconds, after the driving of liquid to the module has been stopped.

When the beverage dispensing is deemed to be over and no liquid is driven to the module anymore, the flow of liquid flowing from the outlet is significantly reduced. Typically, the flow of liquid may pass from a mode of continuous or nearly continuous flow of liquid during beverage dispensing to a dripping mode with drops dripping from the outlet at a gradually slowing down pace, e.g. from 2 to 0.5 or even 0.1 drops/sec, after beverage dispensing.

Hence, after a beverage serving or between beverage servings, residual liquids, e.g. beverage, may drip from the outlet typically in the form of drops. Such liquids into the beverage dispensing area may lead to spills and are generally undesirable, especially when a user, unwilling to wait until all dripping of residual beverage is over, takes away the user-receptacle, e.g. a cup or mug, that collects the beverage from the outlet.

Therefore, in accordance with the invention, the frame further supports a guide configured to drain and deliver liquid residues, e.g. beverage residues, from the beverage outlet to a service area separate from the dispensing area so that such residues are inhibited from being drained from the beverage outlet to the beverage dispensing area.

In general, the guide may be directly or indirectly mounted on the frame. The guide may be fixedly or movable mounted to the frame.

Hence, the guide may act as a drop collector for collecting and evacuating residual beverage drops from the beverage outlet once the ordinary beverage preparation in the module and delivery of a beverage serving from the outlet to a user-recipient is over.

Instead of allowing residual beverage drops to drip into the dispensing area, these drops can be guided to a service area that typically includes a waste collection arrangement. The waste collection arrangement may include a waste collector, such as a waste material tank or reservoir. Examples of such collectors are disclosed in EP 1 867 260, WO 2009/074557, WO 2009/074559 and WO 2009/135869.

Typically, the waste collector is configured for collecting at least one of: one or more waste beverage ingredients, such as a used flavouring ingredient and/or waste water; one or more used capsules for supplying a beverage ingredient into said machine; and a cleaning agent, such as a cleaning, rinsing or descaling liquid.

The dispensing area typically includes a support surface for positioning a user-recipient, e.g. a mug or a cup, to collect the dispensed beverage. The support surface may include a support member that is part of the machine or may be a virtual surface, e.g. the surface of a table on which the machine is placed. Examples of such support surfaces for user-recipients are disclosed in EP 1 867 260 and in WO 2009/074557.

Thus, the frame may surround a volume containing the service area and the dispensing area can be outside the volume surrounded by the frame. Alternatively, the dispensing area can be inside the volume surrounded by the frame. As mentioned above, the service area may containing a collection reservoir collecting for waste material and/or the dispensing area can comprise a support for user-recipients, such as a cup or a mug.

It follows that the machine of the invention includes an arrangement to prevent dripping onto the dispensing area upon a beverage formation and dispensing (e.g. after dispensing of a serving or between dispensing of consecutive servings). In other words, once the process of forming and dispensing the user-requested beverage is over, for instance when the movable part of the beverage preparation module is brought back into its transfer position, e.g. to insert a new ingredient into the seat and/or evacuate the used ingredient from the seat, the outlet of the machine is automatically prevented from dispensing residues on the dispensing area, e.g. drops of residual beverage and/or ingredients thereof. This improves the cleanness and ergonomics of the machine.

Moreover, when the machine is of the type in which the above movable part of the beverage preparation module is arranged to move with the outlet between the transfer and processing positions over the dispensing area—typically a movable front part of the module fixed to the machine's outlet as for example disclosed in WO 2009/043630—in such a case, moving the front part of the module with the outlet into the transfer position does not involve dripping of the outlet over the dispensing area. This can be particularly advantageous when the movable part of the module is brought into the transfer position while a user-recipient, e.g. a cup or mug, is still positioned in the dispensing area: the dripping of liquid, e.g. residues of beverage, from the outlet moving over the dispensing area from above the mouth of the user-recipient over the upright wall(s) of the recipient, and the resulting spills on the recipient wall(s), can be efficiently prevented.

For instance, the guide has a dispensing opening from which the beverage is dispensed to the dispensing area and a service opening from which the residues are drained and delivered to the service area.

The outlet may be connected to the movable part of the beverage preparation module and can be moved by the movable part over the guide between the transfer and the processing positions.

The guide can be configured to drain and deliver residues from the outlet to the service area when the movable part is in the transfer position, the guide being configured to allow the dispensing of beverage from the outlet to the dispensing area when the movable part is in the processing position.

In one embodiment, the guide has a service configuration for draining and delivering residues to the service area and a dispensing configuration for the dispensing of beverage to the dispensing area. The guide is typically movable between these two configurations. The guide can be pivotable between the service configuration and the dispensing configuration, the guide being in particular pivotally mounted on the frame. The guide may be pivotable about a generally horizontal axis, in particular an axis that is generally transverse to the movement of the movable part between the processing and the transfer positions.

The guide may delimit a drainage channel that is tilted down: towards the dispensing area in the dispensing configuration and towards the service area in the service configuration. The outlet is for instance located above the drainage channel so that the beverage and/or said residues are collected in the drainage channel. Optionally, the drainage channel comprises at least one ramp spaced above a bottom of the channel for confining a flow of beverage to the dispensing area or confining a flow of residues to the service area.

The movable part of the beverage preparation module may drive the guide between the service configuration and the dispensing configuration when the movable part is moved between the transfer position and the processing position.

The movable part and the guide can have, respectively, a cam and a cam-follower cooperating together so that:
when the movable part is moved from the transfer position to the processing position, the cam drives the cam-follower to bring the guide from the service configuration to the dispensing configuration; and/or
when the movable part is moved from the processing position to the transfer position, the cam drives the cam-follower to bring the guide from the dispensing configuration to the service configuration.

For instance, at least one of the dispensing and service configurations of the guide is stable. The guide can be urged into one of the dispensing and service configurations by means of gravity and/or a spring means. The guide may be maintained in both dispensing and service configurations by a bi-stable spring means and/or under the effect of friction in said configurations.

The movable part may drive the guide from the service configuration to the dispensing configuration and/or vice versa only over an end-of-travel of displacement of the movable part moving from the transfer position to the processing position and/or vice versa. For instance, the movable part drives the guide over less than 50%, e.g. less than 30%, of the displacement distance. Hence, the guide may be maintained in the dispensing and/or in the service configuration at the beginning of the motion of the movable part from one end position to the other end position so that the beverage and residues continue to be guided to the dispensing area and the service area, respectively, at the beginning of the displacement of the movable part from one end position to the other end position, i.e. the transfer and the processing positions.

The guide may be associated with an automatic return means, such as a return spring or motor, for bringing the guide from the dispensing configuration to the service configuration and/or vice versa. The guide can be brought automatically, in particular by motorization, into a configuration for draining and delivering residues from the outlet to the service area immediately upon formation of the beverage or shortly thereafter and, e.g. 2 to 6 seconds such as 3 to 5 seconds thereafter, when normal dispensing of the beverage to the dispensing area is deemed to be over.

Hence, once a particular beverage processing for a serving is ended, the beverage machine, e.g. typically its control unit that controls the beverage processing, may at the same time or shortly thereafter bring the guide into the service configuration to stop any dripping of residual beverage into the dispensing area.

The movable part of the beverage preparation module can be moved automatically, in particular by a motorization, into the transfer position immediately upon formation of the beverage or shortly thereafter, e.g. 2 to 6 seconds such as 3 to 5 seconds thereafter, when normal dispensing of the beverage to the beverage dispensing area is deemed to be over, typically when a slow dripping of beverage residues begins. For instance, the guide driven by the moving part into the service configuration while the moving part is moved from the processing position to the transfer position.

Suitable examples of a motorization of the movable part of the beverage preparation module, in particular the configuration and type of motor, transmission of the drive from the motor to the movable part and the control of the motor are disclosed in PCT/EP11/057,233, PCT/EP11/057,235 and PCT/EP12/050,033, the content of which are hereby incorporated by way of reference. A further motorization of a movable part of the beverage preparation module is disclosed in EP 1 767 129.

Typically, the machine comprises a control unit for controlling the preparation of the beverage and the configuration of the guide, the control unit being arranged to bring the guide automatically into its service configuration at the end of the beverage preparation. In particular, the control unit may be configured to control a pump means and a thermal conditioner for circulating a liquid, such as water, at a desired temperature to the beverage preparation module. The control unit may also be configured to control the movement of the movable part of the module and/or the guide when they are motorized.

As mentioned above, the beverage preparation module can be configured to house a capsule containing the beverage ingredient, such as ground coffee, instant coffee, tea leaves, cacao and/or milk powder. The module may have at least one capsule opener, such as at least one of: one or more puncturing and/or tearing elements; and one or more pins and/or blades. The beverage preparation module may be connected to a source of liquid, such as water, typically via a thermal conditioner and/or a pump for mixing the beverage ingredient with the liquid to form the beverage.

The movable part of the beverage preparation module may delimit one or more passages for beverage to flow from the ingredient chamber to the outlet. For instance, such passages are in the form of through-holes extending through the movable part.

At the end of a beverage dispensing residual dripping is strongest. Such dripping reduces with a pressure release in the beverage preparation module. A motorized reopening (into the transfer position) of the movable part of the module at the end of a beverage preparation and dispensing reduces the pressure at an early stage and residual beverage drops are handled via the guide. To reduce dripping, the beverage machine may include a pressure release valve upstream the module, for example as disclosed in WO 2011/067264.

BRIEF DESCRIPTION OF THE DRAWINGS

The invention will now be described with reference to the schematic drawings, wherein.

DETAILED DESCRIPTION

Figure 1:
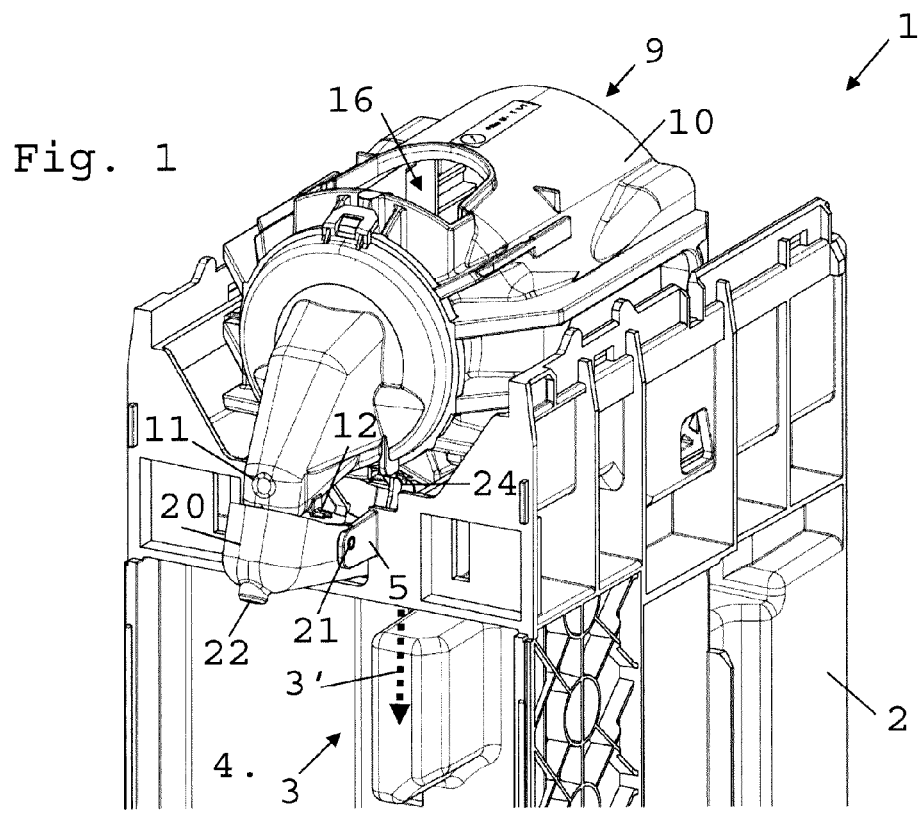
FIGS. 1 and 2 are perspective views of part of a beverage machine according to the invention, having a guide in a service configuration.
Figure 2:
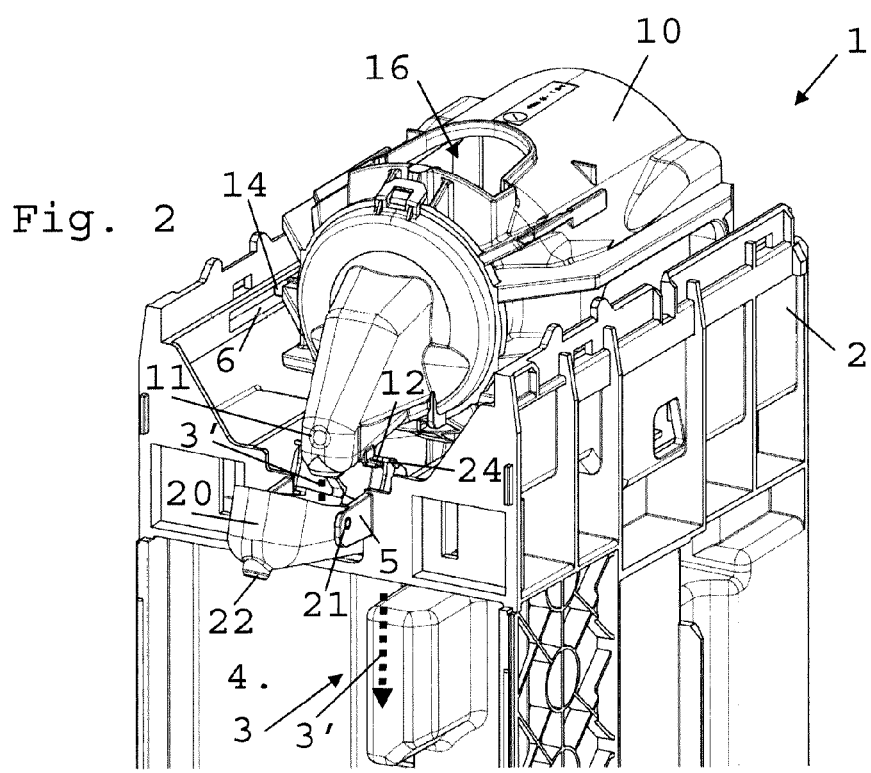

FIGS. 1 to 10 illustrate part of an embodiment of a beverage machine 1 according to the present invention. For instance, the machine is arranged for preparing and dispensing tea and/or coffee or other beverages including liquid food such as soup.

Machine 1 has a frame 2 and a beverage preparation module 9 supported by frame 2 and connected to an internal circuit for circulating liquid from a reservoir (not shown). Examples of such internal circuits and their connection to a beverage preparation module are disclosed in WO 2009/074550 and WO 2009/130099. Module 9, and optionally at least part of frame 2, can be covered by a housing (not shown). In particular, outlet 11 and later discussed guide 20 may be (at least partly) covered or hidden underneath such a housing Beverage preparation module 9 can have a ingredient chamber arranged for containing or housing a flavouring ingredient, in particular a pre-portioned ingredient such as an ingredient supplied to such module within a capsule, and circulating a liquid therethrough to form a beverage 4'. Examples of such beverage preparation modules are disclosed in PCT/EP11/057,233 and PCT/EP11/057,235, the teachings of which are hereby incorporated by way of reference.

Hence, the liquid, e.g. water, may be stored in a reservoir and supplied to the beverage preparation module from such reservoir via a fluid circulation arrangement.

Beverage 4', upon formation, is dispensed via an outlet 11 to a dispensing area 4 (FIGS. 3 and 4), e.g. delimited at the bottom by a support surface for holding a user-recipient, such as a cup or mug. Such support surfaces are well known in the art, e.g. as disclosed in EP 1 867 260 and WO 2009/074557.

Figure 3:
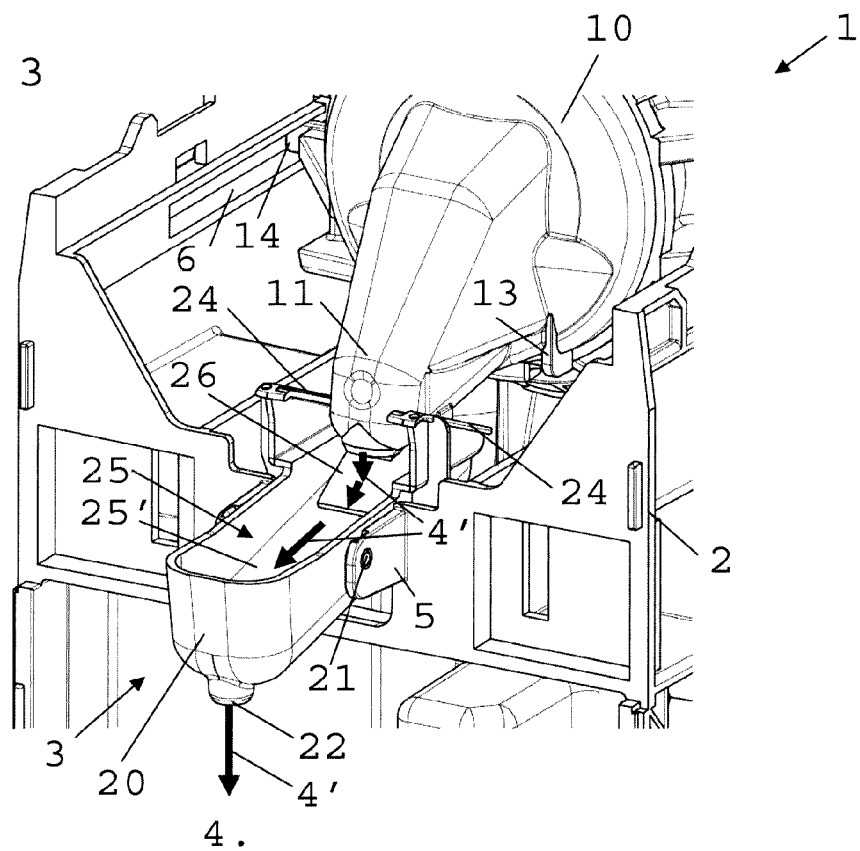
FIGS. 3 and 4 are perspective views of part of the machine of FIGS. 1 and 2 in which the guide is in the dispensing configuration.
Figure 4:
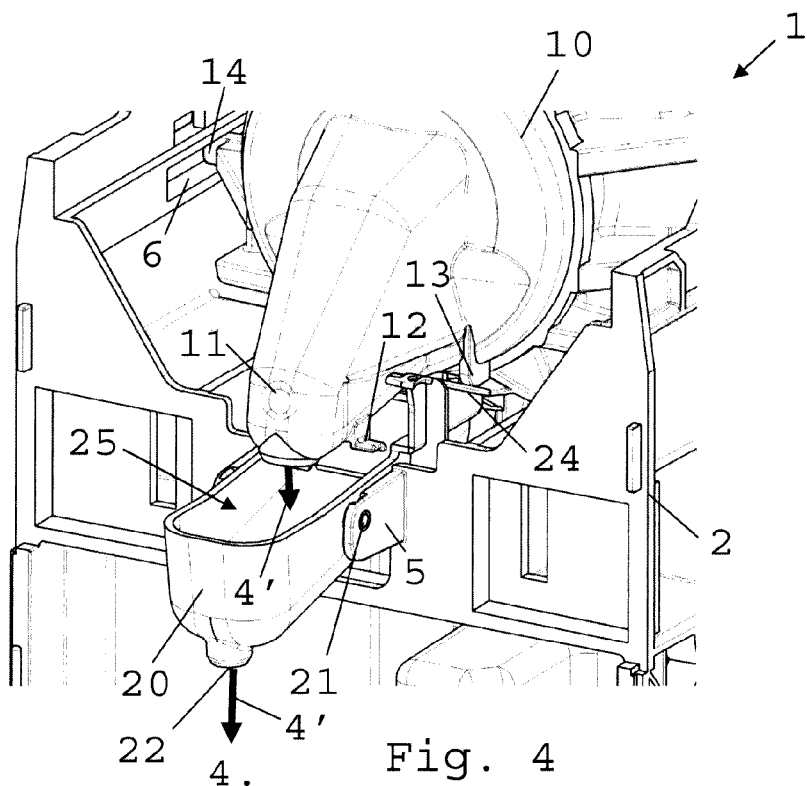
Figure 7:
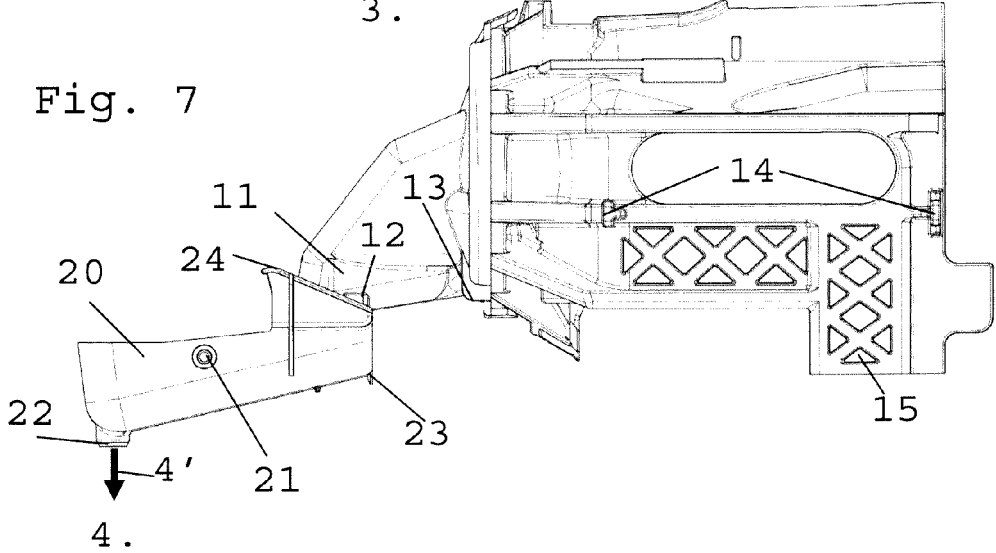

Beverage preparation module 9 has a part 10 that is movable relative to frame 2 between:

a transfer position for introducing a beverage ingredient into module 9, e.g. via insertion passage 16, and/or removing such ingredient therefrom, e.g. via evacuation passage 17 (FIGS. 1, 5 and 10); and a processing position for forming beverage 4' from such ingredient in module 9 (FIGS. 3, 7 and 8).

Movable part 10 may include supports 14, e.g. lateral supports such as 2 or 4 lateral feet, that are guided by frame 2, e.g. in or on corresponding guides or rails or channels 6, when movable part 10 is moved between the transfer position and the processing position along frame 2.

When closed ingredient capsules are used, module 9 may include a capsule opener such as blades and/or a tearing tool, e.g. a plate with a tearing profile.

Machine 1 may have a handle (not shown) actuating movable part 10 and movable between: transfer position (FIG. 1) for loading via a passage 16 the flavouring ingredient, e.g. within a capsule, into module 9; and processing position (FIG. 3) for circulating the liquid into the ingredient chamber in module 9 via a liquid conduit into the ingredient and back into the transfer position (FIG. 1) optionally for unloading via passage 17 the used flavouring ingredient and/or the capsule.

To go from the transfer position to the processing position and/or vice versa, module 9 may be manually actuated via such a handle and/or automatically actuated, e.g. motorised and/or hydraulically actuated.

Module 9 may include two relatively movable parts to form an ingredient chamber in the processing position, such as a brewing unit, of the beverage preparation module. Hence, movable part 10 may cooperated with a second part that is movable or fixed relative to frame 2. These parts are relatively movable from: the transfer position for insertion of the flavouring ingredient into the chamber and/or evacuation of this ingredient therefrom; and a processing position for circulating the liquid through this ingredient in the chamber module 9 to form beverage 4'. The relatively movable parts can be manually and/or automatically movable apart for opening module 9 into the transfer position and moved together for closing module 9 into the processing position. In the processing position, module 9 may tightly enclose the ingredient, typically a solid ingredient such as ground coffee, tea leaves or milk powder, to ensure proper guidance of the liquid through the ingredient.

In accordance with the invention frame 2 further supports a guide 20 configured to drain and deliver liquid residues, such as beverage residues 3', from beverage outlet 11 to a service area 3 separate from dispensing area 4 so that residues 3' are inhibited from being drained from the beverage outlet 11 to dispensing area 4. See FIGS. 1, 5 and 10.

Frame 2 surrounds a volume containing service area 3. Dispensing area 4 is outside the volume surrounded by frame 2. Service area 3 may contain a collection reservoir (not shown) for waste material. Dispensing area 4 can include a support for user-recipients (not shown). Alternatively, the dispensing area may be inside the volume surrounded by the frame.

For instance, service area 3 contains a collector reservoir for collecting used ingredients, such as tea leaves or ground coffee, e.g. within used capsules, and waste liquid. The collector reservoir, e.g. waste collector, may be located in a lower part of frame 2 of machine 1 and have an upper compartment for solids and a lower compartment for liquids. The collector reservoir may be insertable, e.g. slidable, into a cavity formed in machine 1 and removable therefrom for servicing, e.g. emptying the solids and/or liquids contained therein. For example, the storage capacity of the collector reservoir for accumulating used ingredient may be aligned to the storage capacity of a reservoir for the supply of liquid such as water, e.g. as taught in WO 2010/128109.

For instance, used capsules and/or ingredient, may be evacuated to service area 3 via passage 17 when movable part 10 is in the transfer position, passage 17 being formed between movable part 10 and the cooperating part (not shown) of module 9.

The collector reservoir can be positioned underneath beverage preparation module 9 to collect upon beverage preparation the used flavouring ingredient, e.g. ground coffee or tea, evacuated to the reservoir via an evacuation passage, e.g. by gravity. The reservoir typically has an anti-clogging arrangement, as for example taught in WO 2009/074559 and in WO 2009/135869, which are hereby incorporated by way of reference.

Guide 20 can have a dispensing opening 22 from which beverage 4' is dispensed to the dispensing area 4 and a service opening 23 from which residues 3' are drained and delivered to the service area 3. Hence, in a service configuration, residues (or residual beverage 3') drain from outlet 11 onto guide 20 and via service opening 23 into service area 3'; in a dispensing configuration, beverage 4' flows from outlet 11 onto guide 20 and via dispensing opening 22 onto dispensing area 4.

Outlet 11 is typically connected to movable part 10 of beverage preparation module 9 and is moved by movable part 10 over guide 20 between the transfer and the processing positions.

Alternatively, the outlet can be fixed relative to the frame. In this case the guide directs the liquid draining from the outlet either to the dispensing area or to the service area depending on whether the machine is in the process of preparing and dispensing a beverage or whether the machine is not serving any beverage and thus diverts possible liquid residues from the outlet to the service area.

For instance, guide 20 is configured to drain and deliver residues 3' from outlet 11 to service area 3 when movable part 10 is in the transfer position, guide 20 being configured to allow the dispensing of beverage 4' from outlet 11 to dispensing area 4 when movable part 10 is in the processing position.

Guide 20 has a service configuration for draining and delivering residues 3' to service area 3 (FIGS. 1, 5 and 10) and a dispensing configuration (FIGS. 3, 7 and 8) for the dispensing of beverage 4' to dispensing area 4, guide 20 being in particular movable between the service and dispensing configurations, as illustrated in FIGS. 5 to 7 and 8 to 10. In particular, guide 20 can be pivotable between the service configuration and the dispensing configuration. For instance, guide 20 is pivotally mounted on flange 5 of frame 2 via an axis 21. Axis 21 may be generally horizontal and can be generally perpendicular to the movement of movable part 10 between the transfer and the processing positions.

Guide 20 may delimit a drainage channel 25 that is tilted down: towards dispensing area 4 (FIGS. 3, 7 and 8) in the dispensing configuration and towards service area 3 (FIGS. 1, 5 and 10) in the service configuration. Outlet 11 can be located above drainage channel 25 so that beverage 4' and/or residues 3' are collected in channel 25 (FIGS. 1 to 4). Drainage channel 25 can include at least one ramp 26 spaced above a bottom 25' of channel 25 for confining a flow of beverage 4' to dispensing area 4 or confining a flow of residues 3' to the service area 3. Hence, channel 25 may include a pair of such ramps, to prevent that beverage 4' flows to service area 3 or residues 3' flow to dispensing area 4.

Figure 5:
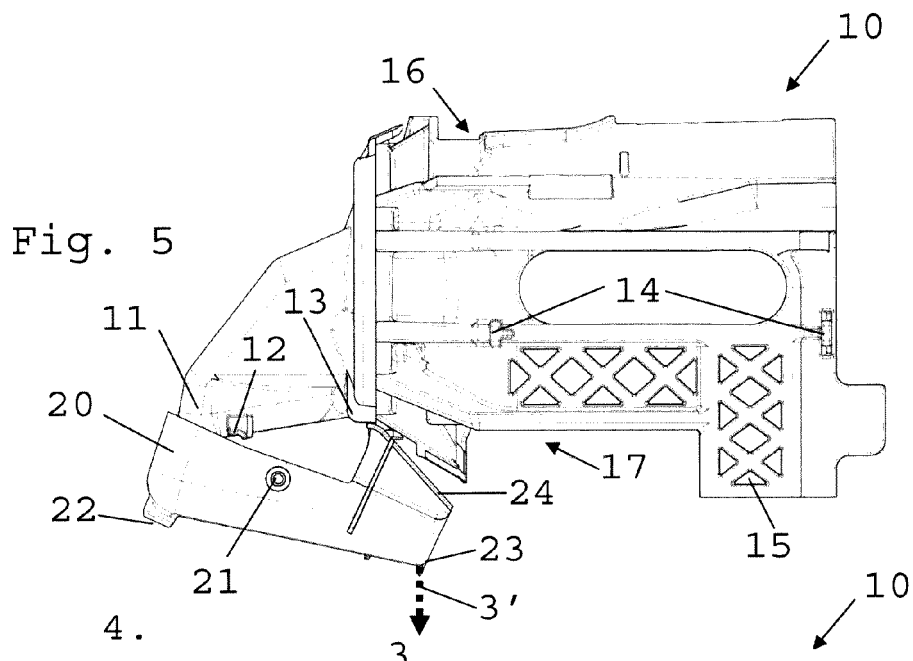
FIGS. 5 to 7 are side views of part of the machine of FIGS. 1 to 4 illustrating the passage of the guide from its service configuration to its dispensing configuration, the passage of the guide from the dispensing to the service configuration being illustrated in FIGS. 8 to 10.

As illustrated in FIG. 3 in which guide 20 in the dispensing configuration, beverage 4' may flow down from outlet 11 onto ramp 26 above and away from rear opening 23 of guide 2, and from ramp 26 onto bottom 25' of channel 25 into dispensing opening 22 above dispensing area 4. When guide 20 is in the service configuration as illustrated in FIGS. 1, 5 and 10, residues 3' drip down from outlet 11 onto bottom 25' of channel 25, underneath ramp 26 (that is spaced above bottom 25') via service opening 23 above service area 3. An analogous configuration may be provided for a ramp directing residual beverage 3' to service area 3.

Movable part 10 of beverage preparation module 9 can advantageously drive guide 20 between the service configuration and the dispensing configuration when movable part 10 is moved between the transfer position and the processing position.

For example, movable part 10 has a first cam 12 and a second cam 13. Guide 20 has a cam-follower 24. Cams 12, 13 and cam-follower 24 cooperate so that: when movable part 10 is moved from the transfer position to the processing position, cam 12 drives the cam-follower 24 to bring guide 20 from the service configuration to the dispensing configuration (FIGS. 5 to 7); and when movable part 10 is moved from the processing position to the transfer position, cam 13 drives cam-follower 24 to bring guide 20 from the dispensing configuration to the service configuration (FIGS. 8 to 10). As illustrated, cam-follower 24 may cooperated with both cams 12, 13. For instance, cam-follower 24 forms a ramp on guide 20. Cam 12 may act on the underside of the ramp whereas cam 13 may act on the upper-side of the ramp 24. The cam arrangement 12, 13, 24 may be provided in pairs, on each side of guide 20 (FIG. 3).

Alternative embodiments are of course possible and contemplated. For instance only one cam and cam-follower may be provided to drive the movement of the guide from one configuration to the other and/or vice versa or two cams and cam-followers may be provided.

Typically, at least one of the dispensing and service configurations of guide 20 is stable. The guide can be urged into one of the dispensing and service configurations by means of gravity and/or a spring means, e.g. a return spring. The guide can be maintained in both dispensing and service configurations by a bi-stable spring means and/or under the effect of friction in these configurations. For instance, pivoting axis 21 produces sufficient friction to maintain guide in the dispensing configuration and in the service configuration even when cam-follower 24 is freed from the corresponding cam 12, 13, as illustrated in FIGS. 2, 4, 6 and 8.

Figure 6:
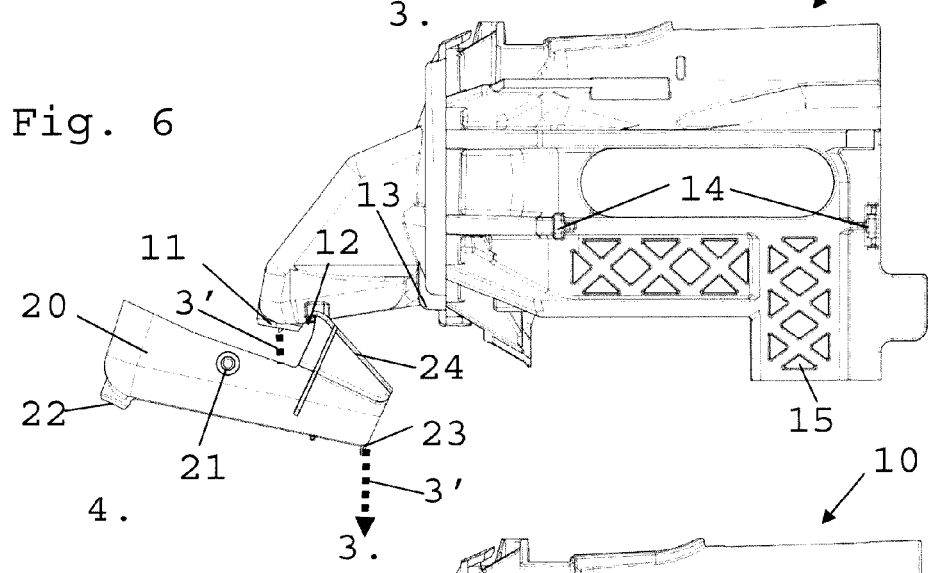

As illustrated in FIGS. 6 and 7 and in FIGS. 9 and 10, movable part 10 may be configured to drive guide 20 from the service configuration to the dispensing configuration and/or vice versa only over an end-of-travel of displacement of movable part 10 moving from the transfer position to the processing position and/or vice versa. Movable part 10 may in particular drive guide 20 over less than 50% such as less than 30% of the displacement distance.

Alternatively or in combination with a cam system, the guide can be associated with an automatic return means, such as a return spring and/or motor and/or gravity, for bringing the guide from the dispensing configuration to the service configuration and/or vice versa.

Guide 20 can be brought automatically, in particular by motorization, into a configuration for draining and delivering residues 3' from beverage outlet 11 to service area 3 immediately upon formation of beverage 4' or shortly thereafter, e.g. 2 to 6 seconds such as 3 to 5 seconds thereafter, when normal dispensing of beverage 4' to beverage dispensing area 4 is deemed to be over, typically when a slow dripping of beverage residues 3' begins.

Movable part 10 of beverage preparation module 9 can be moved automatically, in particular by a motorization, into the transfer position immediately upon formation of beverage 4' or shortly thereafter as explained above, guide 20 being in particular driven by moving part 10 into the service configuration while moving part 10 is moved from the processing position to the transfer position.

Optionally, machine 1 includes a motor (not shown) that drives directly or indirectly movable part 10, e.g. via a transmission system actuating part 10 along upright channel 15. Such a transmission and motorization is for instance disclosed in greater details in PCT/EP11/057,233, PCT/EP11/057,235 and PCT/EP12/050,033, the contents of which are hereby incorporated by reference.

Machine 1 typically comprises a control unit (not shown) for controlling the preparation of beverage 4' and the configuration of guide 20, the control unit being arranged to bring guide 20 automatically into its service configuration at the end of the beverage preparation. For instance, an automatic actuator for moving movable part 10 of module 9 may be controlled to move part 10 from the processing position to the transfer position automatically at the end of a beverage formation, whereby outlet 11 and guide 20 are automatically moved into the service configuration (FIGS. 1, 5, 10).

Machine 1 typically includes one or more of the following components:
a) beverage preparation module 9, e.g. a brewing unit, delimiting in the processing position an inner ingredient chamber for receiving an ingredient of beverage 4' such as a flavouring ingredient, in particular a pre-portioned ingredient supplied within a capsule, and for guiding an incoming flow of liquid, such as water, via an inlet through this ingredient to beverage outlet 11;
b) a heater or cooler (not shown), such as a thermoblock, for heating or cooling this flow of liquid to be supplied to the ingredient chamber;
c) a pump (not shown) for pumping liquid through the heater or cooler to module 9;
d) one or more fluid connecting members (not shown) for guiding liquid from a source of liquid, such as tank of liquid, to module 9;
e) an electric control unit (not shown), in particular comprising a printed circuit board (PCB), for receiving instructions from a user via an interface and for controlling the in-line heater and the pump; and
f) one or more electric sensors (not shown) for sensing at least one operational characteristic selected from characteristics of module 9, the heater or cooler, the pump, liquid tank, the ingredient collector, a flow of liquid, a pressure of liquid and a temperature of liquid, and for communicating such characteristic(s) to the control unit.

A suitable heater may be a boiler, a thermoblock or an on demand heater (ODH), for instance an ODH disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation architectures are for instance disclosed in WO 2009/074550 and WO 2009/130099, which are hereby incorporated by way of reference.

The invention claimed is:

1. A machine for dispensing a beverage, the machine comprising:
a frame; and
a beverage preparation module supported by the frame, the beverage preparation module comprising a movable part that is movable relative to the frame between (i) a transfer position configured for at least one function selected from the group consisting of introducing a beverage ingredient into the beverage preparation module or removing the beverage ingredient therefrom, the beverage ingredient being supplied into the beverage preparation module within a capsule and (ii) a processing position for forming a beverage from the beverage ingredient in the beverage preparation module,
the beverage preparation module further comprising a beverage outlet for dispensing the beverage to a beverage dispensing area for receiving a user-recipient, for collecting the beverage,
the frame further supports a guide configured to drain and deliver liquid residues from the beverage outlet to a service area separate from the beverage dispensing area so that the liquid residues are inhibited from being drained from the beverage outlet to the beverage dispensing area, the guide comprises a dispensing opening from which the beverage is dispensed to the beverage dispensing area and further comprises a service opening from which the liquid residues are drained and delivered to the service area.

2. The machine of claim 1, wherein the frame surrounds a volume containing the service area, and the beverage dispensing area is outside the volume surrounded by the frame.

3. The machine of claim 1, wherein the beverage outlet is connected to the movable part of the beverage preparation module and is moved by the movable part over the guide between the transfer position and the processing position.

4. The machine of claim 1, wherein the guide is configured to drain and deliver the liquid residues from the beverage outlet to the service area when the movable part is in the transfer position, the guide being configured to allow the dispensing of the beverage from the beverage outlet to the dispensing area when the movable part is in the processing position.

5. The machine of claim 1, wherein the guide is configured to move between a service position for draining and delivering the liquid residues to the service area and a dispensing position for the dispensing of the beverage to the dispensing area.

6. The machine of claim 5, wherein the guide is configured to pivotably move between the service position and the dispensing position.

7. The machine of claim 5, wherein the movable part of the beverage preparation module drives the guide to move between the service position and the dispensing position when the movable part is moved between the transfer position and the processing position.

8. The machine of claim 7, wherein the guide is configured to stay in at least one of the dispensing position and the service position.

9. The machine of claim 7, wherein the movable part drives the guide in at least one direction selected from the group consisting of from the service position to the dispensing position and from the dispensing position to the service position, and the movable part drives the guide in the at least one direction only over an end-of-travel of displacement of the movable part moving in at least one movement selected from the group consisting of from the transfer position to the processing position and from the processing position to the transfer position.

10. The machine of claim 1, wherein the guide is associated with an automatic return for moving the guide in at least one direction selected from the group consisting of from the dispensing position to the service position and from the service position to the dispensing position.

11. The machine of claim 1, wherein the guide is brought automatically into a position for draining and delivering the liquid residues from the beverage outlet to the service area immediately upon formation of the beverage or shortly thereafter, when normal dispensing of the beverage to the beverage dispensing area is deemed to be over.

12. The machine of claim 1, wherein the movable part of the beverage preparation module is moved automatically into the transfer position immediately upon formation of the beverage or shortly thereafter when normal dispensing of the beverage to the beverage dispensing area is deemed to be over.

13. The machine of claim 1, comprising a control unit for controlling beverage preparation and positioning of the guide, the control unit being arranged to bring the guide automatically into a service position at the end of the beverage preparation.

14. The machine of claim 5, wherein the guide is pivotable between the service position and the dispensing position about an axis generally transverse to the movement of the movable part between the processing position and the transfer position, the guide defining a drainage channel that is tilted down towards the dispensing area when the guide is in the dispensing position or towards the service area when the guide is in the service position, the beverage outlet being located above the drainage channel so that at least one of the beverage or the liquid residues are collected in the drainage channel.

15. The machine of claim 7, wherein the guide is configured to stay in at least one of the dispensing position and the service position when
- the guide is urged into one of the dispensing position and the service position by at least one of gravity or a spring; or
- the guide is maintained in both the dispensing position and the service position by at least one of a bi-stable spring or an effect of friction in the dispensing position and the service position.

16. The machine of claim 1, wherein the guide is pivotally mounted on the frame.

17. A machine for dispensing a beverage, the machine comprising:
- a frame; and
- a beverage preparation module supported by the frame, the beverage preparation module comprising a movable part that is movable relative to the frame between (i) a transfer position configured for at least one function selected from the group consisting of introducing a beverage ingredient into the beverage preparation module or removing the beverage ingredient therefrom, the beverage ingredient being supplied into the beverage preparation module within a capsule and (ii) a processing position for forming a beverage from the beverage ingredient in the beverage preparation module,
- the beverage preparation module further comprising a beverage outlet for dispensing the beverage to a beverage dispensing area for receiving a user-recipient, for collecting the beverage,
- the frame further supports a guide configured to drain and deliver liquid residues from the beverage outlet to a service area separate from the beverage dispensing area so that the liquid residues are inhibited from being drained from the beverage outlet to the beverage dispensing area,
- the guide is configured to move between a service position for draining and delivering the liquid residues to the service area and a dispensing position for the dispensing of the beverage to the dispensing area,
- the movable part of the beverage preparation module drives the guide to move between the service position and the dispensing position when the movable part is moved between the transfer position and the processing position, and the movable part comprises at least one cam, and the guide has at least one cam-follower, the cam and the cam-follower cooperating in at least one arrangement selected from the group consisting of:
- when the movable part is moved from the transfer position to the processing position, the cam drives the cam-follower to bring the guide from the service position to the dispensing position; and
- when the movable part is moved from the processing position to the transfer position, the cam drives the cam-follower to bring the guide from the dispensing position to the service position.

* * * * *